United States Patent [19]

Vorrier et al.

[11] 4,133,926
[45] Jan. 9, 1979

[54] LAMINATED IDENTIFICATION CARD HAVING SPECIAL INTERLAMINAR ADHESIVE

[75] Inventors: Robert J. Vorrier, Palos Hills; Vitas Niaura, Western Springs, both of Ill.

[73] Assignee: American Hoechst Corporation, Somerville, N.J.

[21] Appl. No.: 812,705

[22] Filed: Jul. 5, 1977

[51] Int. Cl.² .............................................. B32B 3/00
[52] U.S. Cl. ...................................... 428/200; 40/2.2;
156/277; 156/332; 156/333; 260/22 CB;
260/897 B; 260/901; 260/873; 260/899; 283/7;
427/258; 427/407 F; 428/203; 428/916
[58] Field of Search ............... 156/277, 332, 309, 333,
156/315, 334; 427/258, 407 F; 428/76, 203,
200, 520, 201, 916; 40/2.2; 283/7; 260/22 CB,
873, 899, 897 B, 901

[56] References Cited

U.S. PATENT DOCUMENTS

| 2,512,726 | 6/1950 | Penn et al. | 260/899 |
| 2,543,229 | 2/1951 | Chapman | 260/897B |
| 2,671,062 | 3/1954 | Waldie | 260/22 CB |
| 3,725,184 | 4/1973 | Scopp | 428/517 |

Primary Examiner—John T. Goolkasian
Assistant Examiner—J. J. Gallagher
Attorney, Agent, or Firm—Michael J. Tully

[57] ABSTRACT

A laminated article in which a composition containing interpolymerized vinyl chloride, vinyl acetate and vinyl alcohol; a copolymer of ethylene and vinyl acetate and a castor oil-modified sebacic alkyd is interposed between a vinyl skin and the printing on the surface of a vinyl core.

An adhesive composition is also claimed.

17 Claims, 1 Drawing Figure

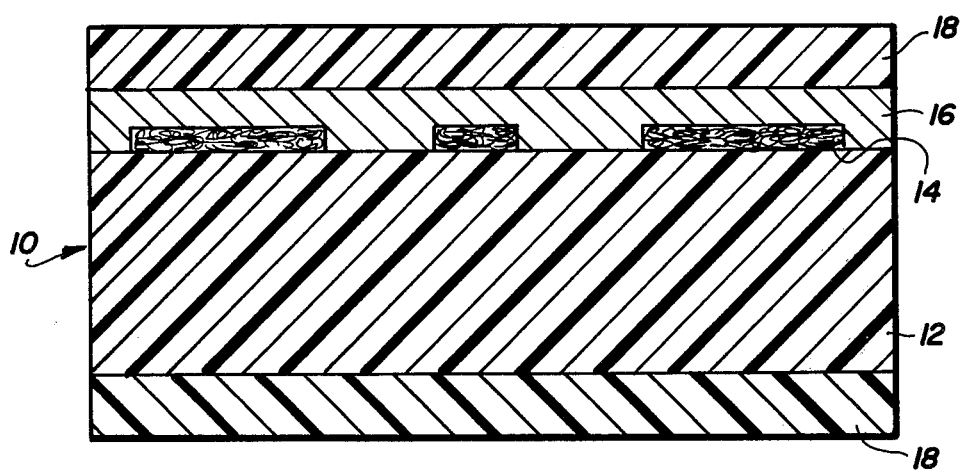

LAMINATED IDENTIFICATION CARD HAVING SPECIAL INTERLAMINAR ADHESIVE

The present invention relates to the laminating art and, more particularly, to an improvement in a laminated article having a printed surface at the laminar interface, and to a method of making the same.

The invention is especially applicable to the manufacture of credit card blanks and will be described with particular reference thereto.

In general, credit card blanks are formed of a core consisting of a rigid vinyl plastic sheet and skins laminated thereto, consisting of flexible vinyl plastic films.

In general, the resin ingredient in the core and in the film consists of a homopolymer of polyvinyl chloride or a copolymer consisting of a major proportion of polyvinyl chloride and a minor proportion of polyvinyl acetate. The terms "vinyl sheet" and "vinyl film" as used in the specification are intended to embrace homopolymers and copolymers.

As is well known, credit cards contain printed matter, identifying in part the organization issuing the credit card, and embossed characters, identifying in part the name and account number of the credit card holder. The embossed characters may additionally reflect the address of the card holder and in some cases, an expiration date for the credit card.

In conventional practice the printing is applied directly to the vinyl sheet, while the embossing is effected after the core has been laminated between the vinyl films.

The printing on the vinyl sheet was usually limited to those portions which would not be embossed due to weaknesses resulting from subsequent processing and handling. Thus, the embossing operation, as well as the subsequent flexing of the embossed characters when operated upon by a credit card data imprinter, tended to promote delamination between the skin and the core. The bond between the unprinted portions of the vinyl sheet and the vinyl film is much stronger than between the printing ink and the vinyl film. Since the latter interface is much more prone to delamination, printed matter was kept away from the areas to be embossed.

In an effort to create more distinctive credit cards, some are now being designed with overall printed matter so that it is no longer possible to emboss only non-printed areas of the card. This has been a contributing factor to a growing problem of premature credit card failure due to delamination.

Other contributing factors include the shift by some card manufacturers from off-set lithographic inks to dry off-set inks which seem to adhere less well to vinyl film. This problem is particularly severe with dry off-set inks which are tailored for compatibility with extruded vinyl sheet. The problem is somewhat less severe with dry off-set inks tailored for compatibility with calendered vinyl sheet.

It will be appreciated that as more and more of the laminar interface is covered with printing ink, the problem of delamination becomes intensified, even in the absence of embossing. Mere flexing of the card can result in delamination, and this is most likely to occur where bleed edge printing, i.e. printing to the edge of the card, is encountered. Cards of conventional manufacture with bleed edge printing will delaminate with as little force as a finger flicked against the edge of the card.

Recently attempts have been made to improve the adhesion between a printed surface and a vinyl film of a laminated article such as a credit card. Thus according to U.S. Pat. No. 3,725,184 a laminated article is disclosed comprising a vinyl sheet having a surface at least a portion of which is printed with a compatible printing ink. A generally transparent vinyl film is laminated to the sheet and is adhered to the sheet and the printed surface by an adhesive composition having on a solids basis from about 88 to about 94 weight percent polyvinyl chloride, from about 2 to about 6 weight percent polyvinyl acetate and from about 2 to about 10 weight percent polyvinyl alcohol interposed between the film and at least the printed portion of the sheet.

Although the adhesive composition described therein improves the lamination strength between the "vinyl film" and the "vinyl sheet" having the printed surface thereon, nevertheless the bonding of the vinyl film to the printing ink is not entirely satisfactory particularly when the "vinyl sheet" is printed with ink all the way out to the margin.

The present invention is an improvement in the adhesive composition disclosed in U.S. Pat. No. 3,725,184 and results in laminated articles having seal strengths, in pounds, as measured on an Instron Tester of up to 8 times stronger than seal strength obtained by use of the composition disclosed in U.S. Pat. No. 3,725,184.

It is therefore an object of the present invention to provide an improvement in credit card blanks and similar laminated articles by increasing their resistance to delamination between the printed surface of the core and the skin laminated thereto.

Another object of the invention is to provide a novel method for improving the adhesion between printing ink on a vinyl sheet, and a vinyl film.

These and other objects and advantages of the invention will become apparent from the following detailed description taken in conjunction with the drawing which is a generally schematic sectional view of a laminated article according to the present invention.

Broadly contemplated, the present invention provides an improvement in laminate articles comprising a vinyl sheet having a surface at least a portion of which is printed with a compatible printing ink, a generally transparent vinyl film laminated to the sheet and an adhesive composition interposed between the film and at least the printed portion of the sheet, the improvement wherein the adhesive composition contains the dry residue, on a solids basis of from about 25 to 75 parts by weight of a vinyl terpolymer which contains about 2 to 6 weight percent of interpolymerized vinyl acetate, about 2 to 10 weight percent interpolymerized vinyl alcohol and about 84 to 96 weight percent interpolymerized vinyl chloride, from about 10 to 50 parts by weight of a copolymer of ethylene and vinyl acetate containing about 35 to 45 percent vinyl acetate and having a melt index of 45–65 dg/min. and from about 10 to 50 parts by weight of a castor oil-modified sebacic alkyd.

In a more specific aspect there is provided an improvement in a laminated article comprising a vinyl sheet having a surface at least a portion of which is printed with a compatible printing ink, a generally transparent vinyl film laminated to the sheet and an adhesive composition disposed therebetween, the improvement wherein the adhesive composition contains the dry residue on a solids basis of from about 30 to 60 parts by weight of a vinyl terpolymer containing from about 84 to about 96 weight percent of interpolymerized vinyl chloride, from about 2 to about 6 weight percent interpolymerized vinyl acetate and from about 2 to about 10 weight percent interpolymerized vinyl alcohol, from about 20 to 50 parts by weight of a copolymer of ethylene and vinyl acetate containing about 35 to 45 percent vinyl acetate and having a melt index of 45-65 dg/min. and from about 20 to 50 parts by weight of a castor oil-modified sebacic alkyd.

Referring to the sole FIGURE depicted in the drawing there is illustrated a schematic sectional view of a laminated structure, for example a credit card identified as reference numeral 10. The structure includes a core 12 formed of a vinyl sheet.

The upper surface of the sheet is partially covered with printing ink 14. It will be appreciated that the invention contemplates covering a portion of the entire surface of the vinyl sheet core with ink, and even applying ink to both surfaces.

Outer skins, identified in the drawing as vinyl film 18 are secured to both surfaces of the vinyl sheet. Interposed between the upper, printed, surface of the vinyl sheet and the vinyl film 18 laminated thereto is a layer identified in the drawing by reference numeral 16. This represents the dry residue of a composition containing (1) interpolymerized vinyl chloride, vinyl acetate, vinyl alcohol, (2) copolymerized ethylene and vinyl acetate and (3) a castor oil-modified sebacic alkyd.

The composition is shown as covering the entire printed surface of the vinyl sheet, both the unprinted portions of the sheet as well as the exposed surface of the printing ink. This structure can be prepared by applying the composition as a coating either to the film or to the printed surface of the vinyl sheet by any of the well known coating methods such as Gravure, Flexography, roller coating, knife coating, spraying, etc. The coating should be dried before the vinyl sheet and vinyl film are laminated to each other. This permits evaporation of the solvents or vehicles in the coating composition so that they will not interfere with the laminating process.

The preferred practice is to apply the composition to the vinyl film as a separate operation and then store the coated film until it is needed. In this way the printing and laminating of the core can proceed without a time delay which would otherwise be required for drying the coating composition.

It will be understood that where the second surface of the vinyl sheet core is provided with printing ink, it may be desirable to interpose the adhesive composition between the ink on the second surface and the vinyl film laminated to it, especially if the printing appears on a portion of the card or other article which is to be embossed.

Vinyl sheet material suitable for use as a core material in making credit card stock and similar laminated articles in accordance with the invention, are commercially available. In general, these sheets are composed of a rigid vinyl composition which may consist of a homopolymer of polyvinyl chloride or a copolymer consisting of a major proportion of polyvinyl chloride and a minor proportion of polyvinyl acetate. Commercially available calendered vinyl sheet which may be used in the practice of the invention include Nixon 5193 manufactured by Nixon-Baldwin Division of Tenneco Inc., and Union Carbide 3603 manufactured by Union Carbide Corporation.

Vinyl films useful in the practice of the invention are also commercially available. Such films, as well as the vinyl sheets described above, are free of plasticizer and either consist of a homopolymer of polyvinyl chloride or a copolymer consisting of a major proportion of polyvinyl chloride and a minor proportion of polyvinyl acetate.

Where the laminated card is to have a white or lightly colored surface, some care must be exercised in the selection of a compatible combination of vinyl film and vinyl sheet. Some vinyl compositions are stabilized with lead carbonate, and others with tin mercaptide. When these two stabilizers are brought together under the heat and pressure of lamination, they will decompose and react to produce lead sulfide. This black compound will contribute gray overtones to a white or lightly colored background. For this reason it may be necessary or desirable to identify the stabilizers used in the vinyl film and vinyl sheet to be certain they are compatible.

Commercially available vinyl film which may be used in the practice of the invention include Nixon 1142 or Nixon 5193 manufactured by Nixon-Baldwin Division of Tenneco Inc. and Union Carbide 3607 manufactured by Union Carbide Corporation.

The printing ink employed forms no part of the present invention and is not critical insofar as the efficacy of the invention is concerned. However, it is necessary that the printing ink be tailored for and compatible with the vinyl sheet to be printed. It is known for example, that printing inks which are satisfactory for use on calendered vinyl sheet may not dry satisfactorily on extruded vinyl sheet. However, once a compatible combination of printing ink and vinyl sheet has been found, practice of the invention can be expected to improve the bond between the printing ink and the vinyl film. Printing inks which are compatible with both calendered vinyl sheets and extruded vinyl sheets are commercially available from Pope & Gray, Division of Martin Marietta Corporation under the trademark VINYLAM.

While the thickness of neither the vinyl sheet nor the vinyl film is critical, for reference purposes it may be noted that the sheet will generally have a thickness within the range of about 0.010 inches to about 0.030 inches. Suitable film thicknesses include the range of about 1 to about 3 mils.

Compositions containing polyvinyl chloride, polyvinyl acetate and polyvinyl alcohol which are useful as one of the ingredients of the final adhesive composition of the present invention are commercially available. While the relative proportions of polyvinyl chloride and polyvinyl acetate do not appear to be critical in achieving improved adhesion between the ink and the vinyl film, the proportion of polyvinyl alcohol appears to contribute to this phenomenon. Thus, it has been found that improved adhesion can be anticipated if the proportion of polyvinyl alcohol is at least about 2 weight percent and preferably within the range of about 4 to about 8 weight percent, based on the total weight of the composition, on a solids basis.

A suitable commercial composition containing the polyvinyl chloride, polyvinyl acetate and polyvinyl alcohol ingredients is sold by Union Carbide Corporation under the designation VAGH. This terpolymer contains about 91 weight percent polyvinyl chloride, about 3 weight percent polyvinyl acetate and about 6 weight percent polyvinyl alcohol, on a solids basis.

The second ingredient of the adhesive composition of the present invention is a copolymer of ethylene and vinyl acetate containing from about 35 to about 45 percent vinyl acetate by weight, preferably about 40 percent by weight vinyl acetate and having a melt index of 45-65 dg./min. The preferred copolymer of ethylene and vinyl acetate is commercially available from the Du Pont Chemical Co., Inc. under the trademark ELVAX 40.

The other ingredient in the adhesive composition of the present invention is castor oil-modified sebacic alkyd produced by the esterification reaction with glycerol or ethylene glycol and is commercially available from Rohm & Haas under the trademark designation PARAPLEX RG-8.

The adhesive composition according to the present invention may be prepared by dissolving the three ingredients, as described above, in a suitable solvent or blend of suitable solvents by using a high speed mixer such as a Cowles Dissolver. An example of an adhesive composition in accordance with this invention contains 10 parts by weight of VAGH, 5 parts by weight of ELVAX 40, 5 parts by weight of RG-8, 30 parts by weight of toluene and 50 parts by weight of methyl ethyl ketone.

It would be useful in the practice of the invention if the adhesive composition is diluted with a suitable solvent to provide a composition containing from about 50 to about 95 weight percent solvents and preferably about 75 weight percent solvents.

The solvent should be selected so that in the time it takes for evaporation, it will not have any substantial detrimental effect on the vinyl film or vinyl sheet. Further, the solvent should evaporate within a reasonable period of time at temperatures not exceeding about 150° F. lest distortion of the substrate occur. Suitable commercially available solvents include methyl ethyl ketone, toluene, 2 nitropropane and THF (tetrahydrofuran).

The method of the invention involves three principal steps, the first of which is the application of ink to the vinyl sheet. This is most frequently accomplished either by off-set lithography or dry off-set printing.

The next step involves the application of the adhesive composition either to ink (and optionally, the surrounding unprinted portions of the vinyl sheet) or to the vinyl film. It will be appreciated that where the coating is applied to the vinyl film the order of the printing and coating steps may be reversed.

As mentioned previously, coating of the vinyl film may be accomplished by any one of a number of well known coating methods. The thickness of the applied coating is not critical and can be varied over reasonable wide limits. In general, thicknesses within the range of about 0.1 mils to about 0.4 mils produces satisfactory results. Thicker coatings can be used but may be difficult to justify economically. Stated another way, the deposition of 2 to 6 grams of coating solids per 1,000 square inches of film will produce a coating of adequate thickness.

As an alternative procedure, the coating may be applied directly to the printed surface of the vinyl sheet using the same coating methods described above for coating the vinyl film. If desired the application of the coating may be limited to the printed portions of the surface of the vinyl sheet, in which case masking, stencils, or electrostatic coating procedures must be employed to localize the application of the coating composition.

The third step of the method involves laminating the vinyl film and vinyl sheet. Conventional laminating conditions of time, temperature and pressure may be employed of which 7 to 20 minutes at about 245 to 320° F. and 300 to 1200 psi are typical.

EXAMPLE 1

A series of laminated articles were prepared by taking commercially printed core stocks. Offset inks designed for printing vinyls were used in these printed core stocks. Vinyl sheets used in these printed core stocks have a thickness of 20 mils, and include Nixon 5193 and Union Carbide 3603. The vinyl sheet was laminated with overlay specimens of vinyl film, one of which was coated with Carbide VAGH, a composition containing 91 weight percent interpolymerized vinyl chloride, 3 percent interpolymerized vinyl acetate and 6 percent interpolymerized vinyl alcohol, and one of which was coated with the adhesive composition of the instant invention in a ratio of 2 parts VAGH, 1 part of a copolymer of ethylene and vinyl acetate containing 40 percent vinyl acetate, and 1 part of castor oil-modified sebacic alkyd. Laminations were made in a hydraulic press at 270° F. under 1,000 lbs/in$^2$ at 11 minutes dwell. The laminated articles were subjected to an Instron Seal Strength Test which measures bond strength by determining the average load per unit width of bond line required to separate progressively one member from the other over the adhered surfaces at a separation angle of 180 degrees, and at a separation rate of 5 in./min. The test was conducted on standard sized specimens. The results are indicated in pounds per ¾ inch width and the results are indicated in the following Table.

TABLE I

| Component | Instron Seal Strength Data Seal Strength in Lbs. Printed Core Stock |
|---|---|
| VAGH | 0.5 |
| Adhesive Composition of Invention | 4.0 |

EXAMPLE II

This Example demonstrates the effectiveness of various ratios of the ingredients of the adhesive composition of the instant invention. Test specimens were prepared according to the procedure of Example I and were coated with the adhesive composition having ratios of ingredients as indicated in Table II below. The VAGH ingredient was as indicated in Example I. The second ingredient was ELVAX 40 and the third ingredient was PARAPLEX RG-8. The specimens were subjected to a Flex Test wherein the specimen was flexed back and forth and checked for delamination after each flex. In addition the specimens were evaluated for the tackiness of the adhesive composition. Since the film overlay is generally marketed in roll or sheet form, adhesives which remain tacky would not be acceptable. Therefore, if release paper is to be avoided, the adhesive must be non-blocking when the vinyl film overlay is stored in rolls or piled as sheets under ambient conditions. The adhesive would become activated under laminating conditions (higher temperatures and pressures). The test for tackiness (Blocking Test) was conducted by applying about 5 lbs. per square inch at 120° F. The results are indicated in Table II below.

TABLE II

| Ratio of VAGH - PARAPLEX RG-8 - ELVAX 40 | | | Instron Seal Strength in lbs. Printed Core Stock | Flex Test | Blocking 5#/sq. in. at 120° F |
|---|---|---|---|---|---|
| 1 | 2 | 1 | 2.0 | Fair | Cling (Tacky) |
| 1 | 1 | 2 | 2.6 | Good | Slight Cling |
| 1.5 | 1.5 | 1 | 3.0 | Good | None |
| 1.5 | 1 | 1.5 | 3.2 | Good | None |
| 3 | .5 | .5 | 1.9 | Fair to Poor | None |
| 2 | 1 | 1 | 4.0 | Good | None |

As will be seen from Table II, the adhesive composition which gave the best results and which is therefore the most preferred according to the present invention is the composition having a ratio of 2 parts VAGH, 1 part PARAPLEX RG-8 and 1 part ELVAX-40.

EXAMPLE III

This example demonstrates the adhesive composition solids concentration insofar as they relate to the seal strength of the laminated article. It was conducted on laminated articles wherein the applied solids on the overlay film were varied from 1.3 lbs. per ream to 7 lbs. per ream. Each ream represented 3,000 square feet. The adhesive compositions which were tested were VAGH, PARAPLEX RG-8, and ELVAX 40 in the ratio as indicated in Table III. The results are indicated in Table III.

TABLE III

Applied Solids as Relating to Seal Strengths

| Adhesive Composition VAGH-RG-8-ELVAX 40 | Instron Seal Strengths at #/ream of Coating wt. | | | |
|---|---|---|---|---|
| | 1.3#/ ream | 3.0#/ ream | 5.0#/ ream | 7.0#/ ream |
| 2 - 1 - 1 | 2.2 | 3.0 | 3.6 | 3.4 |

The present invention has been described in conjunction with certain specific embodiments. However, it will be appreciated that various changes may be made in the illustrated embodiments without departing from the intended scope and spirit of the present invention.

What is claimed is:

1. In a laminate article comprising a vinyl sheet having a surface at least a portion of which is printed with a compatible printing ink, a generally transparent vinyl film laminated to the sheet and an adhesive composition interposed between the film and at least the printed portion of the sheet, the improvement wherein the adhesive composition contains the dry residue on a solids basis of from about 25 to 75 parts by weight of a vinyl terpolymer which contains about 84 to 96 weight percent of interpolymerized vinyl chloride, about 2 to 6 weight percent of interpolymerized vinyl acetate and about 2 to 10 weight percent interpolymerized vinyl alcohol; from about 10 to 50 parts by weight of a copolymer of ethylene and vinyl acetate containing about 35 to 45 percent vinyl acetate and having a melt index of 45-65 dg/min. and from about 10 to 50 parts by weight of a castor oil-modified sebacic alkyd.

2. A laminated article according to claim 1 wherein said article is a credit card blank comprising a vinyl sheet member laminated between two vinyl film members, printing on at least one surface of said vinyl sheet member and wherein the adhesive composition is interposed between the printed surface of said vinyl sheet member and the vinyl film member laminated thereto.

3. A credit card blank according to claim 2 wherein the vinyl terpolymer contains about 91 weight percent interpolymerized vinyl chloride, about 3 weight percent interpolymerized vinyl acetate and about 6 weight percent interpolymerized vinyl alcohol.

4. A credit card blank as defined in claim 2 wherein said adhesive composition contains about 50 parts by weight vinyl terpolymer, about 25 parts by weight of a copolymer of ethylene and vinyl acetate containing about 35 to 45 percent vinyl acetate and having a melt index of 45-65 dg/min. and about 25 parts by weight of a castor oil-modified sebacic alkyd.

5. An adhesive composition containing from about 25 to 75 parts by weight of a vinyl terpolymer which contains about 84 to 96 weight percent of interpolymerized vinyl chloride, about 2 to 6 weight percent of interpolymerized vinyl acetate and about 2 to 10 weight percent interpolymerized vinyl alcohol; from about 10 to 50 parts by weight of a copolymer of ethylene and vinyl acetate containing about 35 to 45 percent vinyl acetate and having a melt index of 45-65 dg/min. and from about 10 to 50 parts by weight of a castor oil-modified sebacic alkyd.

6. An adhesive composition according to claim 5 containing 30 to 60 parts by weight of vinyl terpolymer, 20 to 50 parts by weight of said ethylene vinyl acetate copolymer and about 20 to 50 parts by weight of said castor oil-modified sebacic alkyd.

7. An adhesive composition according to claim 5 wherein said vinyl terpolymer contains about 91 weight percent interpolymerized vinyl chloride, about 3 weight percent interpolymerized vinyl acetate and about 6 weight percent interpolymerized vinyl alcohol.

8. An adhesive composition according to claim 5 containing about 50 parts by weight vinyl terpolymer, about 25 parts by weight of a copolymer of ethylene and vinyl acetate containing about 35 to 45 percent vinyl acetate and having a melt index of 45-65 dg/min. and about 25 parts by weight of a castor oil-modified sebacic alkyd.

9. A vinyl film having an adhesive composition coated on at least one surface thereof, said composition containing from about 25 to 75 parts by weight of a vinyl terpolymer which contains about 84 to 96 weight percent of interpolymerized vinyl chloride, about 2 to 6 weight percent of interpolymerized vinyl acetate and about 2 to 10 weight percent interpolymerized vinyl alcohol; from about 10 to 50 parts by weight of a copolymer of ethylene and vinyl acetate containing about 35 to 45 percent vinyl acetate and having a melt index of 45-65 dg/min. and from about 10 to 50 parts by weight of a castor oil-modified sebacic alkyd.

10. A vinyl film according to claim 9 wherein said adhesive composition contains 30 to 60 parts by weight of vinyl terpolymer, 20 to 50 parts by weight of said ethylene vinyl acetate copolymer and about 20 to 50 parts by weight of said castor oil-modified sebacic alkyd.

11. A vinyl film according to claim 9 wherein said vinyl terpolymer contains about 91 weight percent interpolymerized vinyl chloride, about 3 weight percent interpolymerized vinyl acetate and about 6 weight percent interpolymerized vinyl alcohol.

12. A vinyl film according to claim 9 wherein said adhesive composition contains about 50 parts by weight vinyl terpolymer, about 25 parts by weight of a copolymer of ethylene and vinyl acetate containing about 35 to 45 percent vinyl acetate and having a melt index of 45–65 dg/min. and about 25 parts by weight of a castor oil-modified sebacic alkyd.

13. A vinyl sheet having an adhesive composition coated on at least one surface thereof, said composition containing from about 25 to 75 parts by weight of a vinyl terpolymer which contains about 84 to 96 weight percent of interpolymerized vinyl chloride, about 2 to 6 weight percent of interpolymerized vinyl acetate and about 2 to 10 weight percent interpolymerized vinyl alcohol; from about 10 to 50 parts by weight of a copolymer of ethylene and vinyl acetate containing about 35 to 45 percent vinyl acetate and having a melt index of 45–65 dg/min. and from about 10 to 50 parts by weight of a castor oil-modified sebacic alkyd.

14. A vinyl sheet according to claim 13 wherein said adhesive composition contains 30 to 60 parts by weight of vinyl terpolymer, 20 to 50 parts by weight of said ethylene vinyl acetate copolymer and about 20 to 50 parts by weight of said castor oil-modified sebacic alkyd.

15. A vinyl sheet according to claim 13 wherein said vinyl terpolymer contains about 91 weight percent interpolymerized vinyl chloride, about 3 weight percent interpolymerized vinyl acetate and about 6 weight percent interpolymerized vinyl alcohol.

16. A vinyl sheet according to claim 13 wherein said adhesive composition contains about 50 parts by weight vinyl terpolymer, about 25 parts by weight of a copolymer of ethylene and vinyl acetate containing about 35 to 45 percent vinyl acetate and having a melt index of 45–65 dg/min. and about 25 parts by weight of a castor oil-modified sebacic alkyd.

17. In the method of forming a laminate from a vinyl sheet core and a vinyl film skin by printing at least one surface of a vinyl sheet with an ink compatible therewith, applying an adhesive composition to one of (a) at least the printed portion of the printed surface of said vinyl sheet, and (b) a surface of said vinyl film and laminating said film and said sheet such that said adhesive composition is interposed between said film and the printing on the surface of said sheet the improvement wherein the adhesive composition contains the dry residue on a solids basis of from about 25 to 75 parts by weight of a vinyl terpolymer which contains about 84 to 96 weight percent of interpolymerized vinyl chloride, about 2 to 6 weight percent of interpolymerized vinyl acetate and about 2 to 10 weight percent interpolymerized vinyl alcohol; from about 10 to 50 parts by weight of a copolymer of ethylene and vinyl acetate containing about 35 to 45 percent vinyl acetate and having a melt index of 45–65 dg/min. and from about 10 to 50 parts by weight of a castor oil-modified sebacic alkyd.

* * * * *